United States Patent
Fu et al.

(10) Patent No.: US 8,259,251 B2
(45) Date of Patent: Sep. 4, 2012

(54) BACKLIGHT MODULE AND LIQUID CRYSTAL DISPLAY

(75) Inventors: Shih-Che Fu, Hsin-Chu (TW);
Shao-Wei Chang, Hsin-Chu (TW);
Sung-Mu Nien, Hsin-Chu (TW);
Chao-Chih Wei, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 331 days.

(21) Appl. No.: 12/556,567

(22) Filed: Sep. 9, 2009

(65) Prior Publication Data

US 2010/0259704 A1    Oct. 14, 2010

(30) Foreign Application Priority Data

Apr. 8, 2009    (TW) ................ 98111733 A

(51) Int. Cl.
*G02F 1/1333*    (2006.01)
*G02F 1/1335*    (2006.01)
(52) U.S. Cl. ............... 349/58; 349/61; 349/64
(58) Field of Classification Search ............. 349/64, 349/58, 61
See application file for complete search history.

(56) References Cited

U.S. PATENT DOCUMENTS

| | | |
|---|---|---|
| 7,252,409 B2 | 8/2007 | Kim |
| 7,284,881 B2 | 10/2007 | Kim et al. |
| 2004/0223313 A1 | 11/2004 | Yu et al. |
| 2005/0088586 A1* | 4/2005 | Mori et al. ............. 349/62 |
| 2006/0083019 A1 | 4/2006 | Hahm et al. |
| 2006/0098441 A1 | 5/2006 | Chou |
| 2006/0215421 A1 | 9/2006 | Chang et al. |
| 2007/0064171 A1* | 3/2007 | Moriyasu et al. ........ 349/61 |
| 2008/0204623 A1* | 8/2008 | Tanaka .................... 349/58 |

FOREIGN PATENT DOCUMENTS

| | | |
|---|---|---|
| CN | 200965600 Y | 10/2007 |
| CN | 201069134 Y | 6/2008 |
| TW | M256503 | 2/2005 |
| TW | I275879 B | 3/2007 |
| TW | M307768 | 3/2007 |
| TW | I292502 | 1/2008 |

* cited by examiner

*Primary Examiner* — Wen-Ying P Chen
(74) *Attorney, Agent, or Firm* — Chun-Ming Shih

(57) ABSTRACT

A backlight module includes a back plate having a through opening area, a carrying element disposed on the back plate, a circuit board disposed on the carrying element and at least one light emitting element disposed on the circuit board and corresponding to the through opening area. An LCD includes an LCD panel having a display area and a non-display area opposite to each other, a backlight module including a back plate, a circuit board and at least one light emitting element and a cover disposed at the LCD panel. The back plate disposed at the non-display area has a through opening area corresponding to the non-display area. The light emitting element is disposed on the circuit board and corresponding to the through opening area. The cover has a surface and covers the through opening area. The surface of the cover faces the through opening area and the non-display area.

7 Claims, 11 Drawing Sheets

BACKLIGHT MODULE AND LIQUID CRYSTAL DISPLAY

BACKGROUND

This application claims priority to a Taiwan application No. 098111733 filed on Apr. 8, 2009.

1. Field of the Invention

The present invention generally relates to a backlight module, and more specifically, to a liquid crystal display.

2. Description of the Related Art

FIG. 1 is a schematic exploded three-dimensional view of a conventional liquid crystal display. Referring to FIG. 1, the conventional liquid crystal display (LCD) 100 includes a front frame 110, an LCD panel 120 and a backlight module 130.

The backlight module 130 includes a plurality of optical films 131, a bezel 132, a reflective sheet 133, a circuit board 134, a plurality of light emitting diode elements (LED elements) 135 and a bottom plate 136. The LED elements 135 are disposed on the circuit board 134 and electrically connected to the circuit board 134. The reflective sheet 133 has a plurality of through openings 133a. The reflective sheet 133 is disposed on the circuit board 134 and the LED elements 135 pass through the through openings 133a, respectively.

In the assembling process, the circuit board 134 and the reflective sheet 133 are disposed on the bottom plate 136 in order and the bezel 132 is disposed on the bottom plate 136 so as to fix the circuit board 134 and the reflective sheet 133 in advance. Next, the optical films 131 are disposed in the bezel 132 and on the reflective sheet 133. Next, the LCD panel 120 is disposed on the optical films 131. Finally, the front frame 110 is fixed to the bottom plate 136 so that the LCD 100 is assembled completely.

When the assembled LCD 100 operates, the light emitted from the LED elements 135 passes through the optical films 131 and the light modulated by the optical films 131 uniformly enters the LCD panel 120.

However, when a part of the LED elements 135 are damaged, a maintenance member has to detach the front frame 110, the LCD panel 120, the optical films 131, the bezel 132 and the reflective sheet 133 in order before replacing the damaged LED elements 135. Thus, the repairing process for the backlight module 130 of the conventional LCD 100 is complex.

BRIEF SUMMARY

The present invention is directed to provide a backlight module of which the repairing process for light emitting elements is relatively simple.

The present invention is also directed to provide a liquid crystal display of which the repairing process for light emitting elements of a backlight module is relatively simple.

The present invention provides a backlight module including a back plate, a carrying element, a circuit board and at least one light emitting element. The back plate has a through opening area. The carrying element is disposed on the back plate. The circuit board is disposed on the carrying element. The light emitting element is disposed on the circuit board and corresponding to the through opening area.

In one embodiment of the present invention, the carrying element is detachably disposed on the back plate. Additionally, the backlight module further includes a fixing element and the carrying element is disposed on the back plate by means of the fixing element. In addition, the carrying element further includes a pivot element and the carrying element is pivotally connected to the back plate by means of the pivot element.

In one embodiment of the present invention, the circuit board is detachably disposed between the back plate and the carrying element. Additionally, the backlight module further includes at least one fixing element and the circuit board is fixed between the back plate and the carrying element by means of the fixing element.

In one embodiment of the present invention, the backlight module further includes a plurality of light emitting elements. The circuit board includes a first body and a second body. A part of the light emitting elements are disposed on the first body and another part of the light emitting elements are disposed on the second body. The carrying element includes a third body and a fourth body. The third body and the fourth body are disposed on the back plate, respectively. The first body and the second body are disposed on the third body and the fourth body, respectively.

In one embodiment of the present invention, the through opening area has a though opening and the light emitting element is corresponding to the through opening.

In one embodiment of the present invention, the backlight module further includes a plurality of light emitting elements. The through opening area has a plurality of through openings and the light emitting elements are corresponding to the through openings, respectively.

In one embodiment of the present invention, the carrying element has a first surface. The first surface faces the through opening area and the circuit board is disposed on the first surface.

In one embodiment of the present invention, the carrying element has a first surface and a second surface opposite to each other. The first surface faces the through opening area, the circuit board is disposed on the second surface and the light emitting element passes through the carrying element.

In one embodiment of the present invention, the carrying element is a plate body, a rib or a ring-shaped frame.

In one embodiment of the present invention, the light emitting element is an LED element.

The present invention provides a liquid crystal display including an LCD panel, a backlight module and a cover. The LCD panel has a display area and a non-display area opposite to each other. The backlight module includes a back plate, a circuit board and at least one light emitting element. The back plate is disposed at the non-display area and has a through opening area corresponding to the non-display area. The light emitting element is disposed on the circuit board and corresponding to the through opening area. The cover is disposed at the LCD panel. The cover has a surface and covers the through opening area of the back plate. The surface of the cover faces the through opening area and the non-display area and the circuit board is disposed on the surface.

In one embodiment of the present invention, the backlight module further includes a plurality of light emitting elements. The circuit board includes a first body and a second body. A part of the light emitting elements are disposed on the first body and another part of the light emitting elements are disposed on the second body.

In one embodiment of the present invention, the through opening area has a though opening and the light emitting element is corresponding to the through opening.

In one embodiment of the present invention, the backlight module further includes a plurality of light emitting elements. The through opening area has a plurality of through openings and the light emitting elements are corresponding to the through openings, respectively.

In one embodiment of the present invention, the light emitting element is an LED element.

Since the carrying element or the cover is disposed on the back plate, when a part of the light emitting elements are damaged, a maintenance member can repair the light emitting elements on the circuit board by means of detaching the carrying element, opening the carrying element or detaching part of the cover. Therefore, compared with the conventional art, the repairing process for the backlight module of the embodiment of the present invention is relatively simple and easy.

BRIEF DESCRIPTION OF THE DRAWINGS

The accompanying drawings are included to provide a further understanding of the invention, and are incorporated in and constitute part of this specification. The drawings illustrate embodiments of the invention and, together with the description, serve to explain the principles of the invention.

DETAILED DESCRIPTION

Reference will now be made to the drawings to describe exemplary embodiments of the present invention, in detail. The following description is given by way of example, and not limitation.

[First Embodiment]

Figure 1:
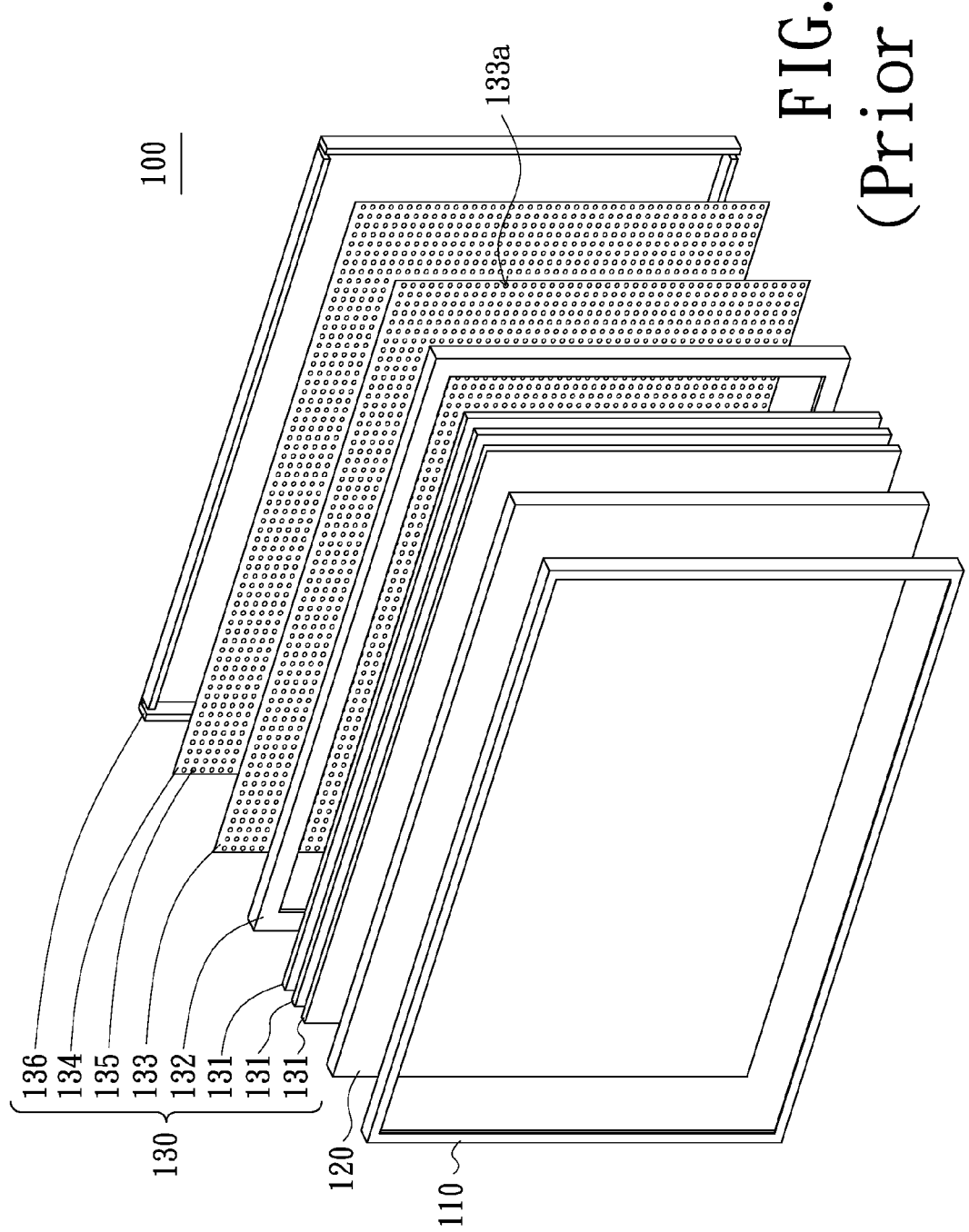
FIG. 1 is a schematic exploded three-dimensional view of a conventional liquid crystal display.
Figure 2A:
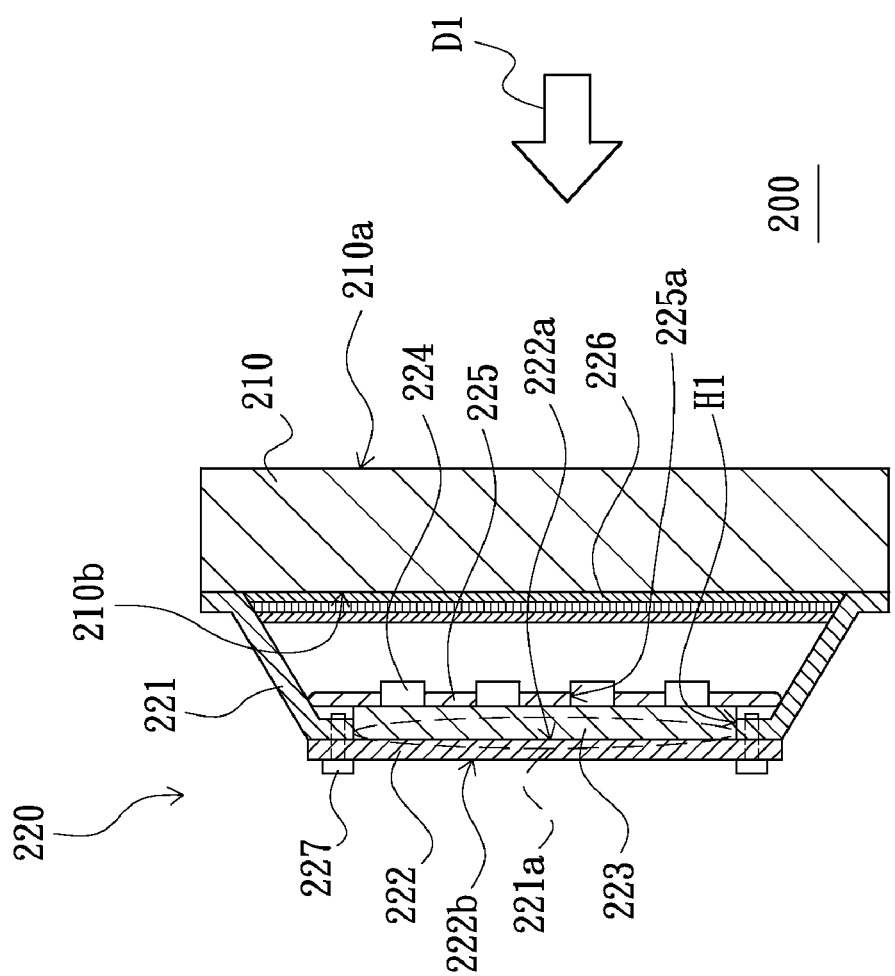
FIG. 2A is a schematic cross-sectional view of a liquid crystal display according to a first embodiment of the present invention.
Figure 2B:
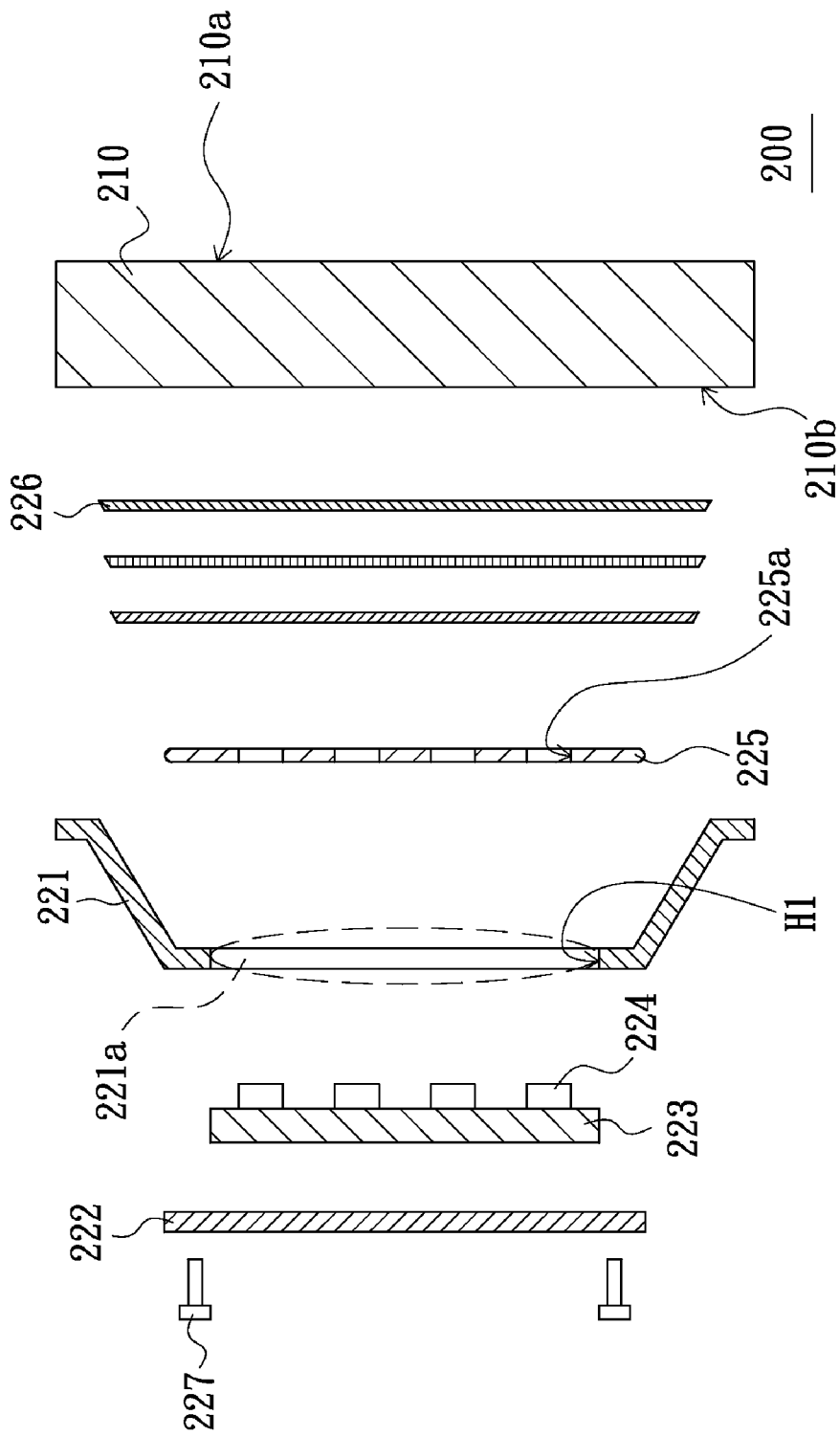
FIG. 2B is a schematic exploded view of the liquid crystal display of FIG. 2A.

FIG. 2A is a schematic cross-sectional view of a liquid crystal display according to a first embodiment of the present invention. FIG. 2B is a schematic exploded view of the liquid crystal display of FIG. 2A. Referring to FIG. 2A and FIG. 2B, the liquid crystal display 200 of this embodiment includes an LCD panel 210 and a backlight module 220. The backlight module 220 has a back plate 221, a carrying element 222, a circuit board 223, at least one light emitting element 224 (FIG. 2 schematically shows a plurality of light emitting elements 224), a reflective sheet 225, a plurality of optical films 226 and at least one fixing element 227 (FIG. 2 schematically shows a plurality of fixing elements 227). The back plate 221 has a through opening area 221a and the through opening area 221a has a through opening Hi. The back plate 221 is disposed on a non-display area 210b of the LCD panel 210.

The carrying element 222 may be a plate body. The carrying element 222 is disposed on the back plate 221 and has a first surface 222a and a second surface 222b opposite to each other. The first surface 222a of the carrying element 222 faces the through opening area 221a. In this embodiment, the carrying element 222 is detachably disposed on the back plate 221 by means of the fixing elements 227. The fixing elements 227 may be screws. The circuit board 223 is disposed on the first surface 222a of the carrying element 222. The light emitting elements 224 may be a plurality of LED elements. The light emitting elements 224 are disposed on the circuit board 223 and corresponding to the through opening Hi of the through opening area 221a.

The reflective sheet 225 has a plurality of through openings 225a. The reflective sheet 225 is disposed on the circuit board 223. The light emitting elements 224 pass through the through openings 225a, respectively. The optical films 226 are disposed above the light emitting elements 224. The LCD panel 210 is disposed on the optical films 226 and connected to the back plate 221.

When the liquid crystal display 200 of this embodiment operates, the light emitted from the light emitting elements 224 passes through the optical films 226 and the light modulated by the optical films 226 uniformly enters the LCD panel 210. Therefore, a user can view the information displayed on a display area 210a of the LCD panel 210 along a viewing direction D I shown in FIG. 2A.

Since the carrying element 222 is disposed on the back plate 221, when a part of the light emitting elements 224 are damaged, a maintenance member can detach the carrying element 222 from the back plate 221 and detach the circuit board 223 from the carrying element 222 so as to repair the light emitting elements 224 on the circuit board 223 without detaching the back plate 221 from the LCD panel 210. Therefore, compared with the conventional art, the repairing process for the backlight module 220 of this embodiment is relatively simple and easy.

[Second Embodiment]

Figure 3A:
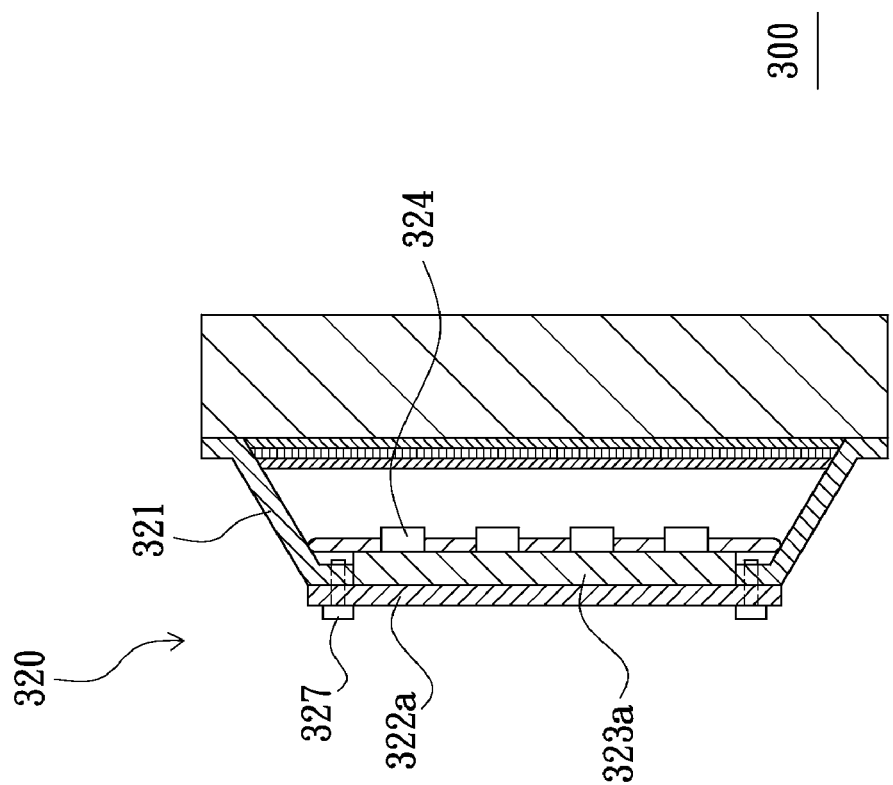
FIG. 3A is a schematic cross-sectional view of a liquid crystal display according to a second embodiment of the present invention.
Figure 3B:
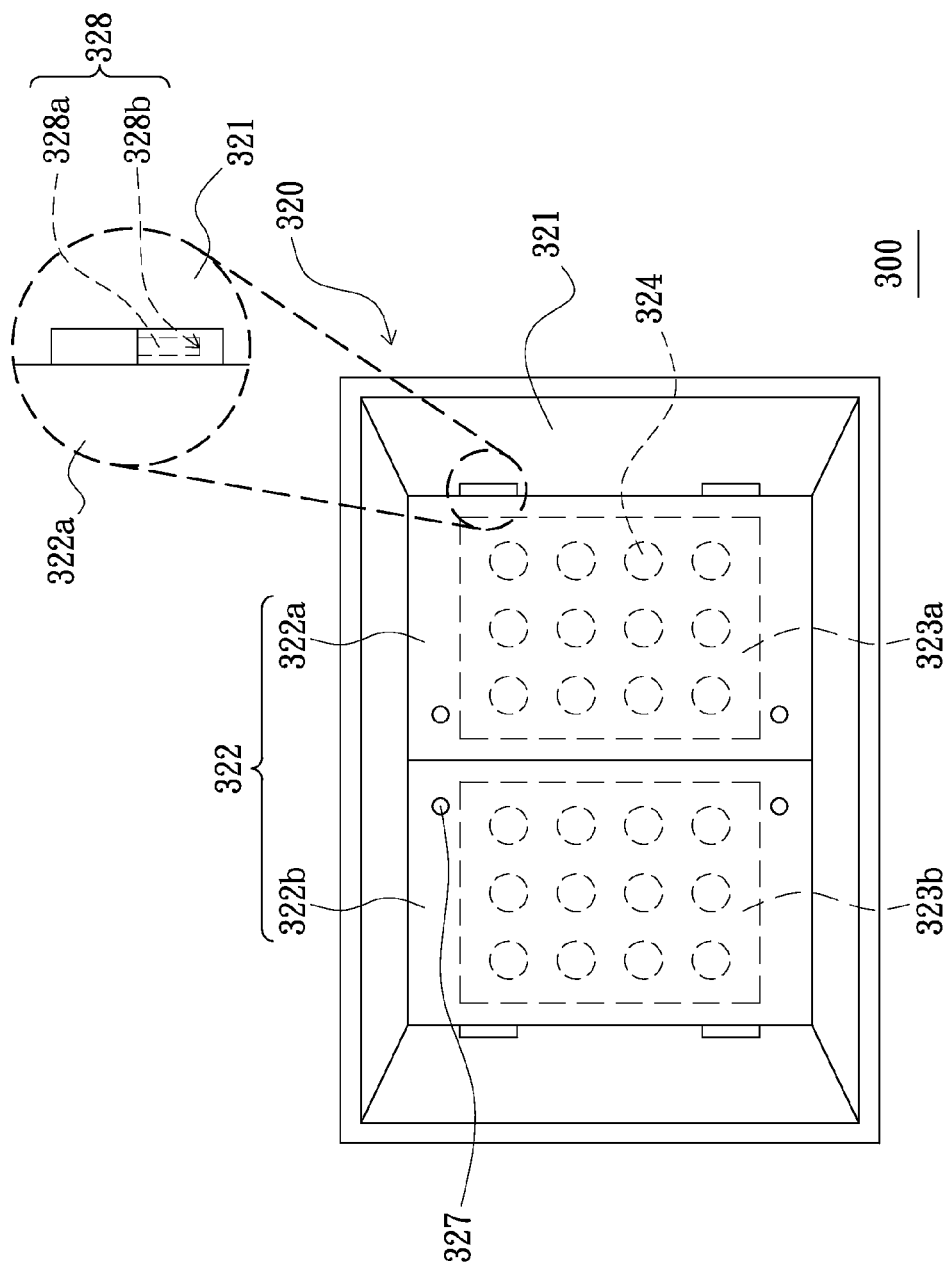
FIG. 3B is a schematic rear view of a backlight module of FIG. 3A.

FIG. 3A is a schematic cross-sectional view of a liquid crystal display according to a second embodiment of the present invention. FIG. 3B is a schematic rear view of a backlight module of FIG. 3A. Referring to FIG. 3A and FIG. 3B, the difference between the liquid crystal display 300 of the second embodiment and the liquid crystal display 200 of the first embodiment is that the carrying element 322 of the backlight module 320 of the second embodiment is pivotally connected to the back plate 321.

Specifically, the circuit board 323 includes a first body 323a and a second body 323b. A part of the light emitting elements 324 are disposed on the first body 323a and another part of the light emitting elements are disposed on the second body 323b. The carrying element 322 includes a third body 322a and a fourth body 322b. The first body 323a and the second body 323b of the circuit board 323 are disposed on the third body 322a and the fourth body 322b of the carrying element 322, respectively. The third body 322a and the fourth body 322b of the carrying element 322 are pivotally connected to the back plate 321, respectively. More specifically, the backlight module 320 includes a plurality of pivot elements 328 and each of the pivot elements 328 includes a pivot shaft 328a and a pivot hole 328b. A part of the pivot shafts 328a are disposed at the third body 322a of the carrying element 322 and another part of the pivot shafts 328a are disposed at the fourth body 322b of the carrying element 322. The pivot holes 328b are disposed at the back plate 321 and the pivot shafts 328b are inserted into the pivot holes 328b, respectively.

When a part of the light emitting elements 324 need to be repaired, a maintenance member can loosen the fixing elements 327 and then open the third body 322a and the fourth body 322b of the carrying element 322 relatively to the back plate 321 in a similar manner as opening a door. As a result, the light emitting elements 324 are exposed to the outside. At this time, the maintenance member can detach the first body 323a and the second body 323b of the circuit board 323 from the carrying element 322 to repair the damaged light emitting elements 324.

[Third Embodiment]

Figure 4A:
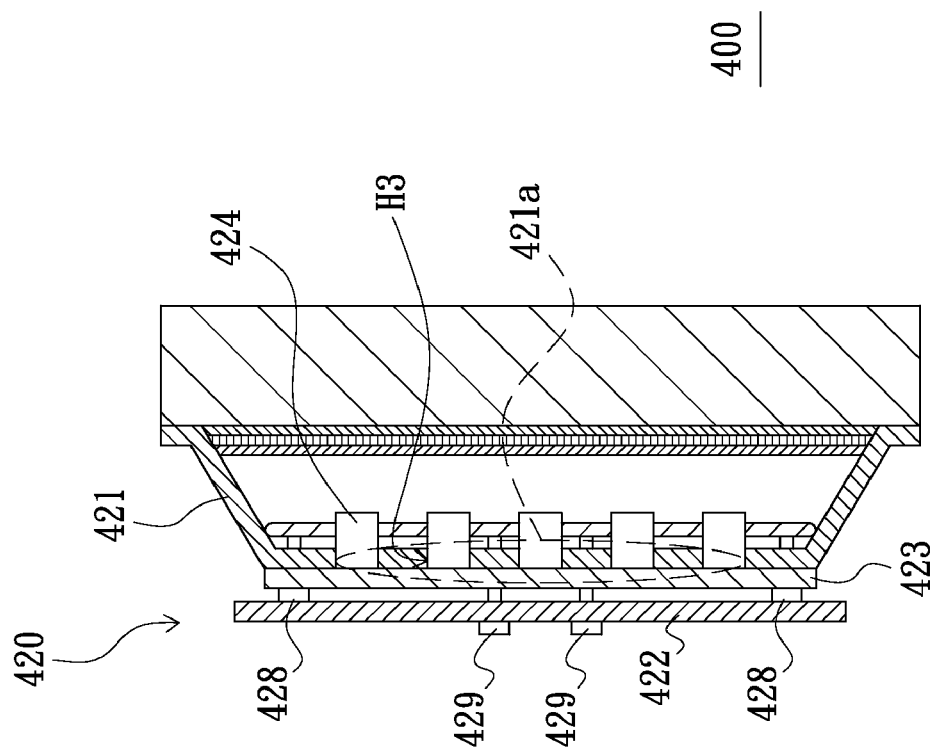
FIG. 4A is a schematic cross-sectional view of a liquid crystal display according to a third embodiment of the present invention.

FIG. 4A is a schematic cross-sectional view of a liquid crystal display according to a third embodiment of the present invention. Referring to FIG. 4A, the backlight module 420 of a liquid crystal display 400 of the third embodiment includes a plurality of fixing elements 428 such as screws and a plurality of fixing elements 429 such as screws. The circuit board 423 is detachably disposed between the back plate 421 and the carrying element 422. The assembling process for the backlight module 420 of this embodiment is described in the following. First, the circuit board 423 is fixed on the back plate 421 by means of the fixing elements 428. Next, the carrying element 422 such as a plate body is fixed on the circuit board 423 and the back plate 421 by means of the fixing elements 429. To sum up, the circuit board 423 is fixed between the back plate 421 and the carrying element 422 by means of the fixing elements 428 and 429.

The carrying element 422 of this embodiment can be designed as a plate body to increase the structural strength of the backlight module 420 on the whole. Additionally, the carrying element 422 may be made of material with high thermal conductivity (i.e. metal) so as to increase the heat-dissipation efficiency of the backlight module 420. Moreover, the through opening area 421a of the back plate 421 of this embodiment has a plurality of through openings H3 and the light emitting elements 424 are corresponding to the through openings H3, respectively. In this embodiment, the light emitting elements 424 pass through the through openings H3, respectively.

Figure 4B:
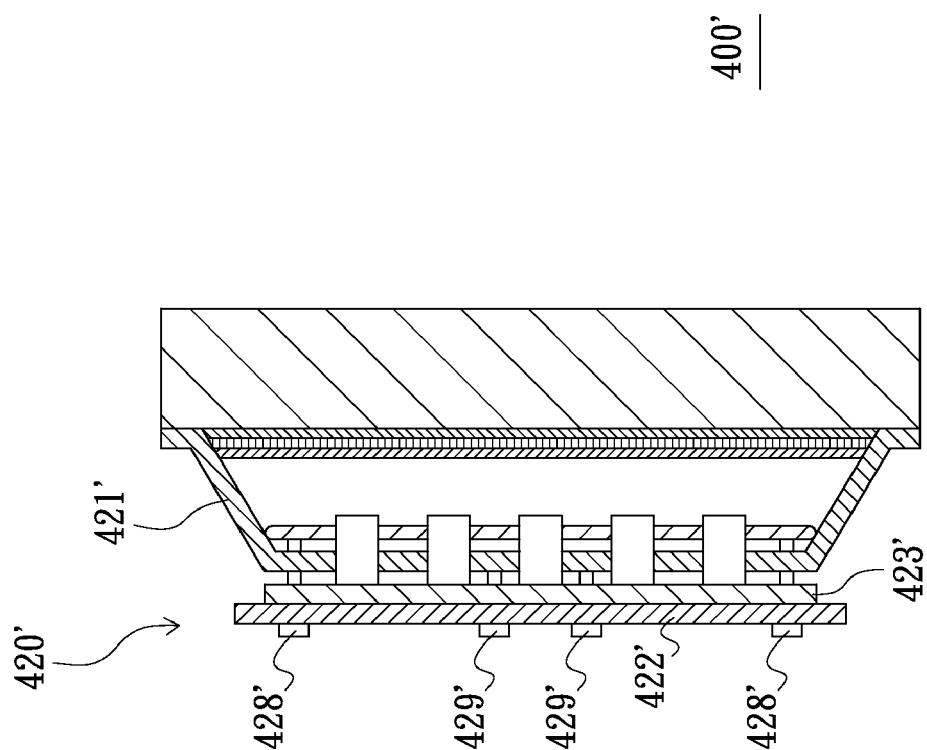
FIG. 4B is a schematic cross-sectional view of another liquid crystal display according to the third embodiment of the present invention.

FIG. 4B is a schematic cross-sectional view of another liquid crystal display according to the third embodiment of the present invention. Referring to FIG. 4A and FIG. 4B, the difference between the liquid crystal display 400' and the liquid crystal display 400 is that the assembling process for the backlight module 420' of the liquid crystal display 400' is different from that for the backlight module 420 of the liquid crystal display 400. The assembling process for the backlight module 420' is described in the following. First, the circuit board 423' is fixed on the carrying element 422' by means of the fixing elements 429'. Next, the carrying element 422' is fixed on the back plate 421' by means of the fixing elements 428'.

[Fourth Embodiment]

Figure 5A:
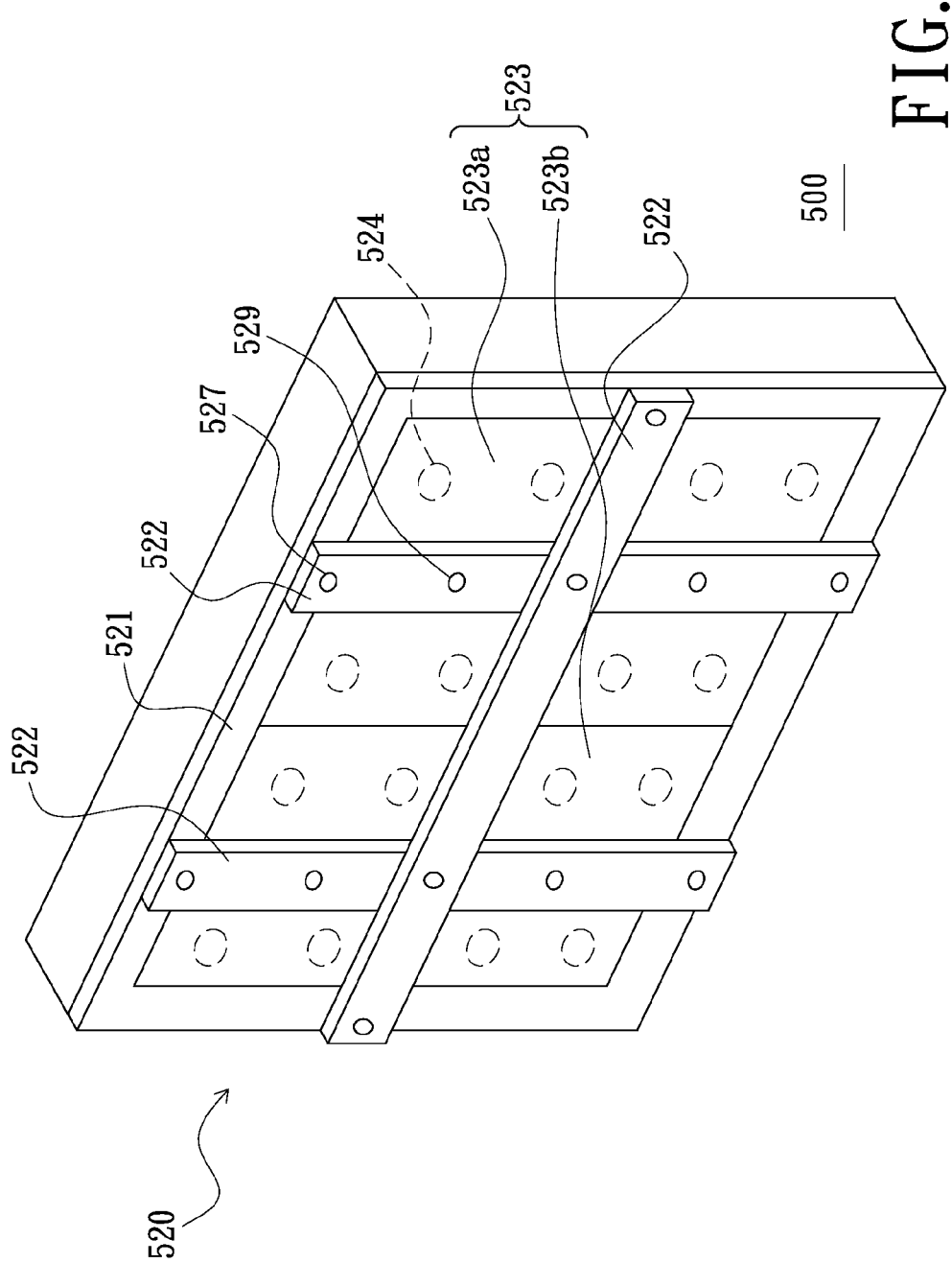
FIG. 5A is a schematic three-dimensional view of a liquid crystal display according to a fourth embodiment of the present invention.

FIG. 5A is a schematic three-dimensional view of a liquid crystal display according to a fourth embodiment of the present invention. Referring to FIG. 5A, the difference between the liquid crystal display 500 of the fourth embodiment and the liquid crystal display 200 of the first embodiment is that the carrying element 522 of the backlight module 520 of the fourth embodiment is designed as a plurality of ribs and the carrying element 522 covers part of the circuit board 523.

The assembling process for the backlight module 520 of this embodiment is described in the following. First, the circuit board 523 is detachably disposed on the carrying element 522, in other words, the circuit board 523 is fixed on the carrying element 522 by means of a plurality of fixing elements 529 (i.e. screws). Next, the carrying element 522 is detachably disposed on the back plate 521, that is, the carrying element 522 is fixed on the back plate 521 by means of a plurality of fixing elements 527.

In addition, the circuit board 523 of this embodiment includes a first body 523a and a second body 523b. A part of the light emitting elements 524 are disposed on the first body 523a and another part of the light emitting elements are disposed on the second body 523b. The carrying element 522 such as the ribs can reduce the weight of the backlight module 520, maintain the structural strength of the backlight module 520 and carry another element such as a circuit board.

Figure 5B:
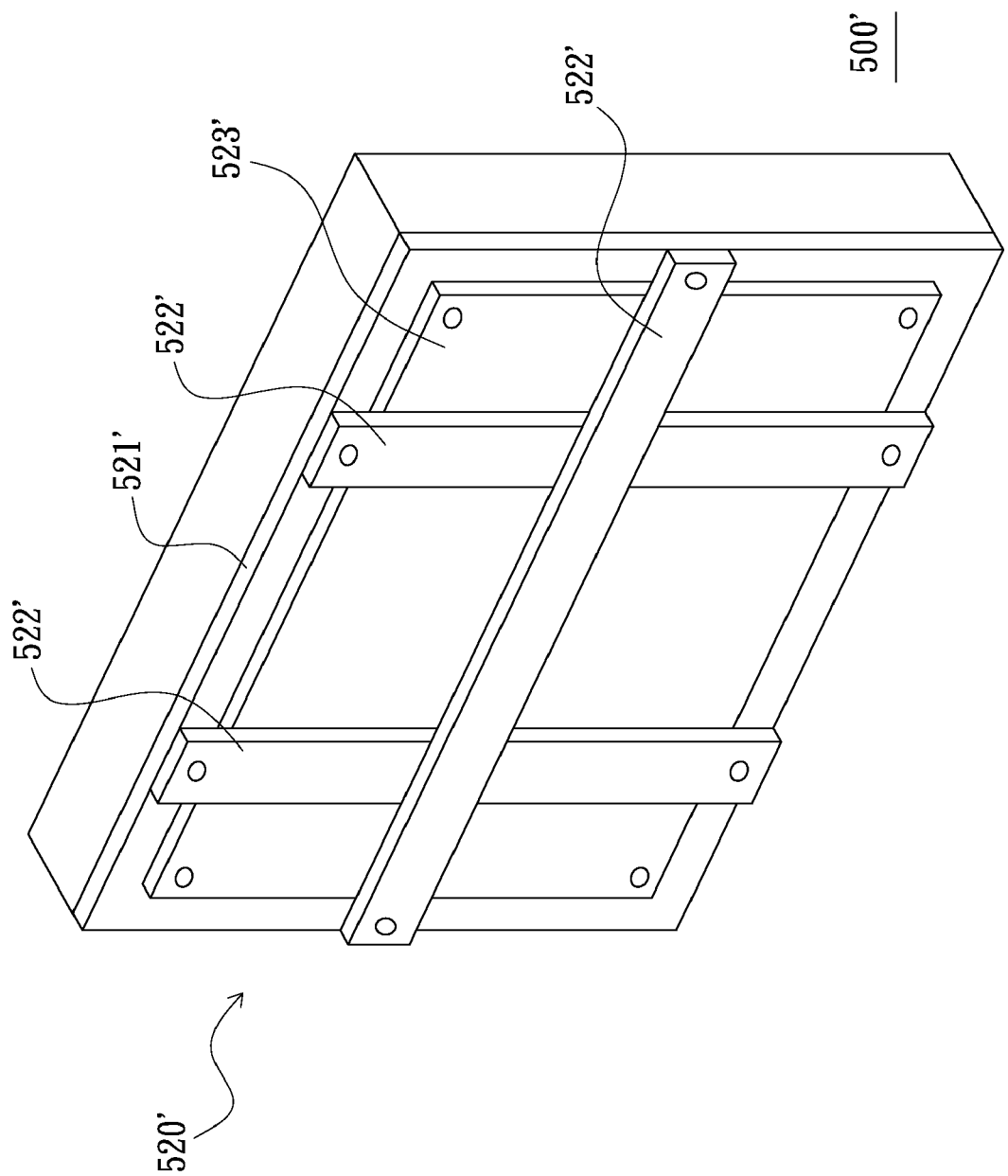
FIG. 5B is a schematic three-dimensional view of another liquid crystal display according to the fourth embodiment of the present invention.

FIG. 5B is a schematic three-dimensional view of another liquid crystal display according to the fourth embodiment of the present invention. Referring to FIG. 5A and FIG. 5B, the difference between the liquid crystal display 500' and the liquid crystal display 500 of the fourth embodiment is that the circuit board 523' of the backlight module 520' of the liquid crystal display 500' can be disposed on the back plate 521' in advance and then the carrying element 522' such as the ribs is disposed on the back plate 521'.

[Fifth Embodiment]

Figure 6:
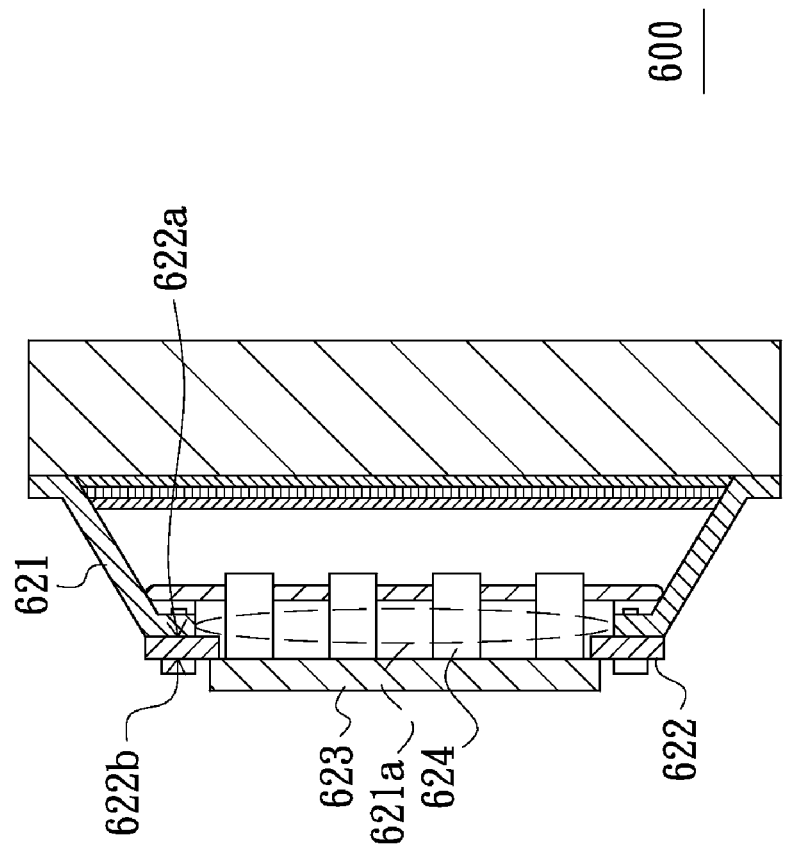
FIG. 6 is a schematic cross-sectional view of a liquid crystal display according to a fifth embodiment of the present invention.

FIG. 6 is a schematic cross-sectional view of a liquid crystal display according to a fifth embodiment of the present invention. Referring to FIG. 6, the difference between the liquid crystal display 600 of this embodiment and the liquid crystal display 200 of the first embodiment is that the carrying element 622 is, for example, a ring-shaped frame and the circuit board 623 is disposed on a second surface 622b of the carrying element 622. In addition, a first surface 622a of the carrying element 622 faces the through opening area 621a of the back plate 621. The first surface 622a and the second surface 622d are opposite to each other. The light emitting elements 624 disposed on the circuit board 623 pass through the carrying element 622.

[Sixth Embodiment]

Figure 7:
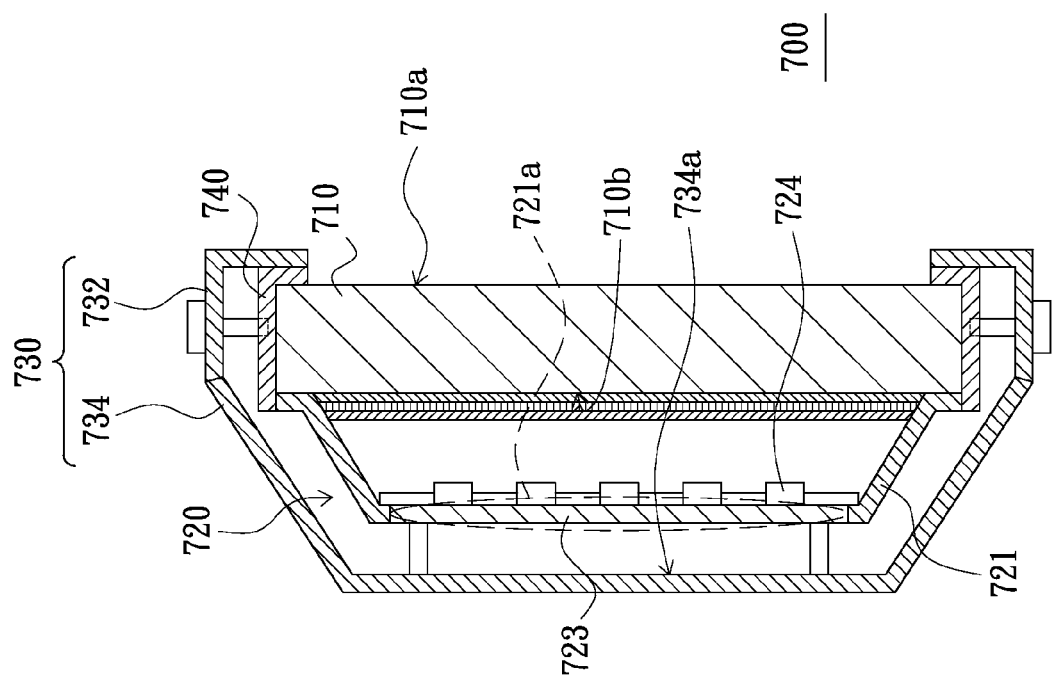
FIG. 7 is a schematic cross-sectional view of a liquid crystal display according to a sixth embodiment of the present invention.

FIG. 7 is a schematic cross-sectional view of a liquid crystal display according to a sixth embodiment of the present invention. Referring to FIG. 7, the liquid crystal display 700 of this embodiment includes a LCD panel 710, a backlight module 720, a cover 730 and a front frame 740. The front frame 740 and the back plate 721 of the backlight module 720 are connected together in a manner of buckling. To sum up, the front frame 740, the LCD panel 710 and the backlight module 720 are assembled together and the display area 710a of the LCD panel 710 is exposed by the front frame 740. The cover 730 of this embodiment includes a front portion 732 and a back portion 734. The front portion 732 and the back portion 734 are connected together in a manner of buckling. The front portion 732 is fixed to the front frame 740. The display area 710a of the LCD panel 710 is also exposed by the front portion 732 of the cover 730.

The back portion 734 of the cover 730 has a surface 734a and the back portion 734 of the cover 730 covers the through opening area 721a of the back plate 721 of the backlight module 720. The surface 734a of the back portion 734 of the cover 730 faces the through opening area 721a and the non-display area 710b of the LCD panel 710. In addition, the circuit board 723 of the backlight module 720 is disposed on the surface 734a of the back portion 734 of the cover 730.

When a part of the light emitting elements 724 of the backlight module 720 need to be repaired, a maintenance member can directly detach the back portion 734 of the cover 730 and repair the light emitting elements 724 disposed on the circuit board 723 which is disposed on the back portion 734.

As mentioned above, the backlight module and the liquid crystal display of the embodiment of the present invention have at least one of the following advantages or other advantages. Since the carrying element or the cover is disposed on the back plate, when a part of the light emitting elements are damaged, the maintenance member can repair the light emitting elements on the circuit board by means of detaching the carrying element (referring to the first embodiment, the third embodiment, the fourth embodiment and the fifth embodiment), or opening the carrying element (referring to the second embodiment) or detaching part of the cover (referring to the sixth embodiment). Therefore, compared with the conventional art, the repairing process for the backlight module of the embodiment of the present invention is relatively simple and easy.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A backlight module comprising:
    a back plate having a through opening area;
    a carrying element detachably disposed on the back plate;
    a circuit board disposed on the carrying element;
    at least one light emitting element disposed on the circuit board and corresponding to the through opening area; and
    a pivot element, wherein the carrying element is pivotally connected to the back plate by means of the pivot element.

2. The backlight module as claimed in claim 1, further comprising a plurality of light emitting elements, wherein the circuit board comprises a first body and a second body, a part of the light emitting elements are disposed on the first body, another part of the light emitting elements are disposed on the second body, the carrying element comprises a third body and a fourth body, the third body and the fourth body are disposed on the back plate, respectively, and the first body and the second body are disposed on the third body and the fourth body, respectively.

3. The backlight module as claimed in claim 1, wherein the through opening area has a though opening and the light emitting element is corresponding to the through opening.

4. The backlight module as claimed in claim 1, further comprising a plurality of light emitting elements, wherein the through opening area has a plurality of through openings and the light emitting elements are corresponding to the through openings, respectively.

5. The backlight module as claimed in claim 1, wherein the carrying element has a first surface, the first surface faces the through opening area and the circuit board is disposed on the first surface.

6. A backlight module comprising:
    a back plate having a through opening area;
    a carrying element disposed on the back plate;
    a circuit board disposed on the carrying element and detachably disposed between the back plate and the carrying element;
    at least one light emitting element disposed on the circuit board and corresponding to the through opening area; and
    at least one fixing element, wherein the circuit board is fixed between the back plate and the carrying element by means of the fixing element.

7. The backlight module as claimed in claim 6, wherein the carrying element is a rib.

* * * * *